United States Patent
Joshi (10) Patent No.: US 6,636,804 B1
(45) Date of Patent: Oct. 21, 2003

(54) METHOD FOR ASSOCIATING THE FEATURES OF TWO GEOGRAPHIC DATABASES

(75) Inventor: Rajashri Joshi, Chicago, IL (US)

(73) Assignee: Navigation Technologies Corp., Chicago, IL (US)

( * ) Notice: Subject to any disclaimer, the term of this patent is extended or adjusted under 35 U.S.C. 154(b) by 0 days.

(21) Appl. No.: 10/134,256

(22) Filed: Apr. 29, 2002

(51) Int. Cl.⁷ .................................................. G01C 21/00
(52) U.S. Cl. ........................................................ 701/208
(58) Field of Search ................................. 701/208, 200, 701/207

(56) References Cited

U.S. PATENT DOCUMENTS

| | | | |
|---|---|---|---|
| 5,590,261 A | 12/1996 | Sclaroff et al. | 395/173 |
| 2003/0055759 A1 * | 3/2003 | Conkwright et al. | 705/35 |

OTHER PUBLICATIONS

Pilu, Maurizio, Digital Media Department, HP Laboratories Bristol, HPL–97–96, "Uncalibrated Stereo Correspondence by Singular Value Decomposition", presented at *Computer Vision & Pattern Recognition*, Puerto Rico. (Jun., 1997).

Henrichsen, A. and de Jager, G., Department of Electrical Engineering, University of Cape Town, Rondebosch 7701, So. Africa, "Point Matching in Uncalibrated Images", Technical Paper, *Pattern Recognition Association of South Africa*, PRASA (2000).

* cited by examiner

Primary Examiner—Yonel Beaulieu
(74) Attorney, Agent, or Firm—Jon D. Shutter; Frank J. Kozak; Lawrence M. Kaplan (57) ABSTRACT

A method of determining geographic feature association between geographic features of a first geographic database and a second geographic database builds a proximity matrix having a proximity value element for each of the features of the first geographic database as compared to each of the features of the second geographic database. A singular value decomposition of the proximity matrix is computed, and the singular value decomposition is converted into an association matrix. Using the association matrix, the method identifies an associated feature pair having one feature of the first geographic database and one feature of the second geographic database.

20 Claims, 6 Drawing Sheets

METHOD FOR ASSOCIATING THE FEATURES OF TWO GEOGRAPHIC DATABASES

BACKGROUND OF THE INVENTION

The present invention relates to data representations of geographic features in a geographic database and more particularly, the present invention relates to a method for determining geographic feature association between the geographic features of one geographic database and the geographic features of another geographic database.

A geographic database contains data that represents some of the physical features in a geographic region. Located in the geographic region are physical features, such as road networks, points of interest (including businesses, municipal facilities, etc.), lakes, rivers, railroads, municipalities, etc. The road network includes, among other things, roads and intersections located in the geographic region. Each road in the geographic region is composed of one or more road segments that represent a portion of the road. Generally, the geographic database that represents the geographic region contains at least one database record (also referred to as "entity" or "entry") for each road segment in the geographic region.

The need to establish an association between geographic features represented in one database with the geographic features represented in another database arises in various applications relating to the use of the data representations of the geographic features. Some of these applications include measuring geographic database accuracy, detecting geographic database changes and geographic database conflation. For instance, measuring geographic database accuracy evaluates how closely a representation of the geographic features (e.g., sampled road segments) match the actual geographic features (e.g., ground truth road segments).

One method for associating the geographic features of two geographic databases is to visually identify which geographic feature of a second geographic database most likely corresponds to one of the geographic features of a first geographic database. Typically, a map containing the graphical representation of the geographic features of the first database for a particular region is plotted over a map containing the graphical representation of the geographic features of the second database for the same region. If a geographic feature of the first geographic database is at a similar location and has a similar shape as a geographic feature of the second geographic database, for example, the two features nearly overlap, the two features are selected as being associated. This visual identification of the associated feature pairs is performed over the entire plotted region. Furthermore, this visual identification process needs to be performed for each of the numerous geographic regions represented in the databases which can be very time consuming and labor intensive.

Accordingly, there exists a need for an improved way to determine an association between the geographic features of two geographic databases.

SUMMARY OF THE INVENTION

To address these and other objectives, the present invention includes a method of determining geographic feature association between geographic features of a first geographic database and a second geographic database. An m×n proximity matrix G is built comprising a proximity value element for each of the m features of the first geographic database compared to each of the n features of the second geographic database. A singular value decomposition of the proximity matrix G is computed into a form $G=TDU^T$ where T is an m×m orthogonal matrix, U is an n×n orthogonal matrix, and D is a m×n diagonal matrix having a plurality of diagonal elements. The singular value decomposition is converted into an association matrix P by forming a matrix E by replacing each of the diagonal elements of the diagonal matrix with one and computing the association matrix P using the following product $P=TEU^T$. An associated feature pair is identified. The associated feature pair comprises the feature in the first geographic database and the feature of the second geographic database that is a largest element in both one of the rows and one of the columns of the association matrix P.

DETAILED DESCRIPTION OF THE PRESENTLY PREFERRED EMBODIMENTS

I. Geographic Database

Figure 1:
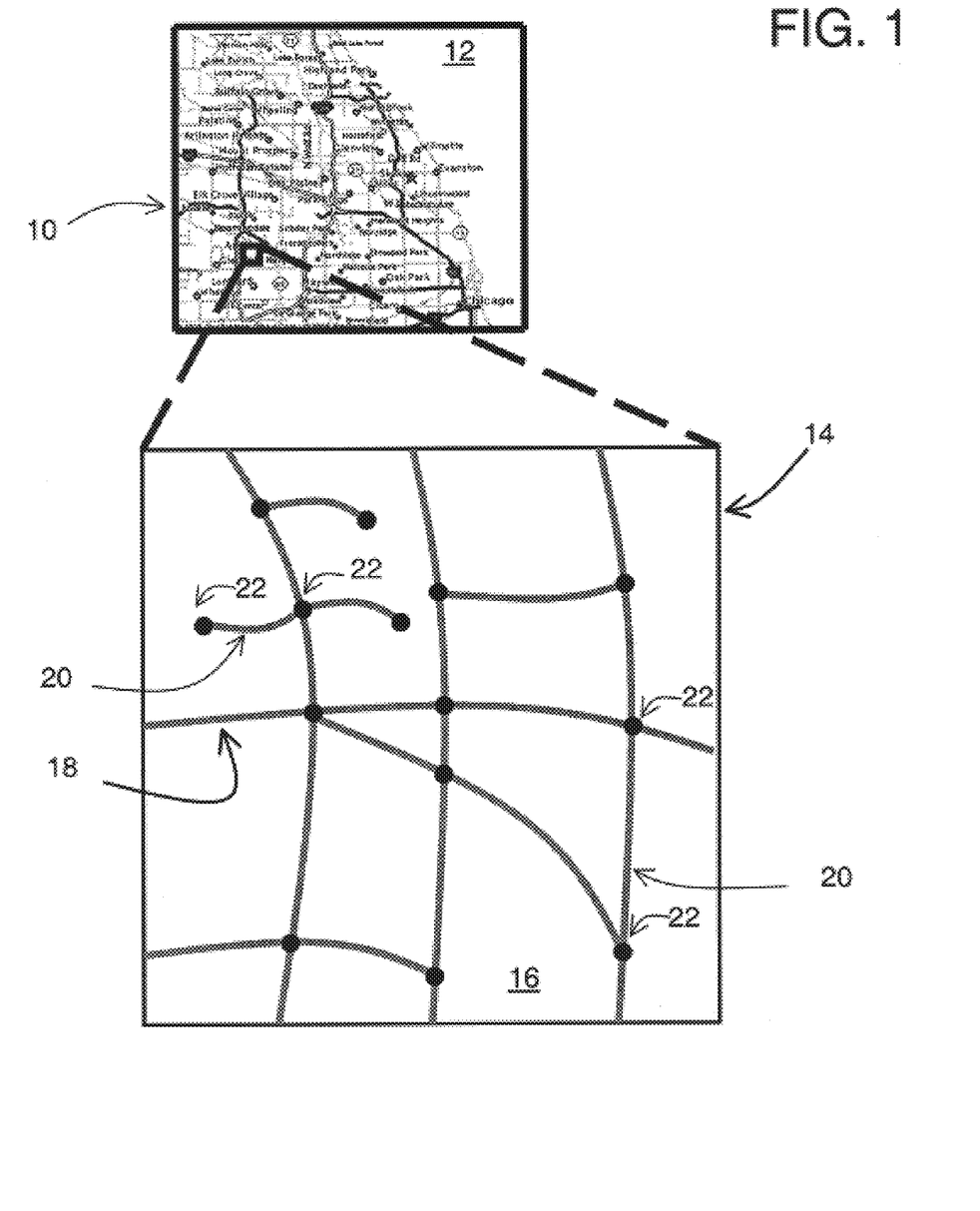
FIG. 1 shows a map of a geographic region.

FIG. 1 shows a map 10 of a geographic region 12. The geographic region 12 may correspond to a metropolitan or rural area, a state, a country, or combinations thereof, or any other area of comparable size. Located in the geographic region 12 are physical geographic features, such as roads, points of interest (including businesses, municipal facilities, etc.), lakes, rivers, railroads, municipalities, etc.

FIG. 1 also includes an enlarged map 14 of a portion 16 of the geographic region 12. The enlarged map 14 illustrates part of the road network 18 in the geographic region 12. The road network 18 includes, among other things, roads and intersections located in the geographic region 12. As shown in the portion 16, each road in the geographic region 12 is composed of one or more road segments 20. A road segment 20 represents a portion of the road. Each road segment 20 is shown to have associated with it two nodes 22; one node represents the point at one end of the road segment and the other node represents the point at the other end of the road segment. The node at either end of a road segment may correspond to a location at which the road meets another road, e.g., an intersection, or where the road dead ends.

Figure 2:
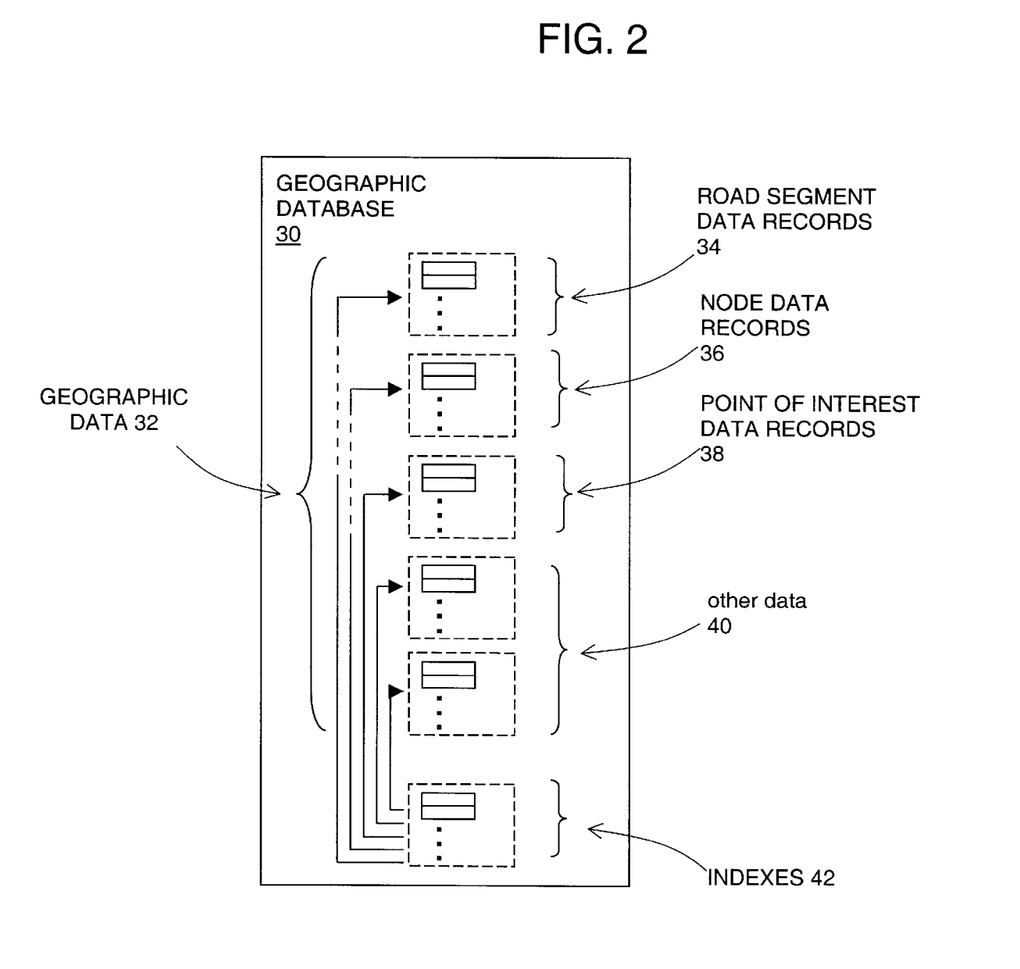
FIG. 2 is a block diagram of a geographic database that represents the geographic region of FIG. 1.

Referring to FIG. 2, a geographic database 30 contains data 32 that represents some of the physical geographic features in the geographic region (12 in FIG. 1). The data 32 contained in the geographic database 30 includes data that represent the road network. In the embodiment of FIG. 2, the geographic database 30 that represents the geographic region 12 contains at least one database record 34 (also referred to as "entity" or "entry") for each road segment 20 in the geographic region 12 in FIG. 1. The geographic database 30 that represents the geographic region 12 also includes a database record 36 (or "entity" or "entry") for each node 22 in the geographic region 12. (The terms "nodes" and "segments" represent only one terminology for describing these physical geographic features and other terminology for describing these features is intended to be encompassed within the scope of these concepts.)

The road segment data record 34 may contain several components. For example, the road segment data record 34 may include a segment ID by which the data record can be identified in the geographic database 30. Each road segment data record 34 has associated with it information (such as "attributes", "fields", etc.) that describes features of the represented road segment. The road segment data record 34 may include data that indicate the restrictions, if any, on the direction of vehicular travel permitted on the represented road segment. The road segment data record 34 may include data that indicate a speed limit or speed category (i.e., the maximum permitted vehicular speed of travel) on the represented road segment. The road segment data record 34 may also include data indicating whether the represented road segment is part of a controlled access road (such as an expressway), a ramp to a controlled access road, a bridge, a tunnel, a toll road, a ferry, and so on.

The road segment data record 34 also includes data providing the geographic coordinates (e.g., the latitude and longitude) of the endpoints of the represented road segment. In one embodiment, the data are references to the node data records 36 that represent the nodes corresponding to the endpoints of the represented road segment. The road segment data record 34 may also include or be associated with other data that refer to various other attributes of the represented road segment. The various attributes associated with a road segment may be included in a single road segment record, or may be included in more than one type of record which are cross-referenced to each other. For example, the road segment data record 34 may include data identifying what turn restrictions exist at each of the nodes which correspond to intersections at the ends of the road portion represented by the road segment, the name or names by which the represented road segment is known, the street address ranges along the represented road segment, and so on. Each of the node data records 36 may have associated information (such as "attributes", "fields", etc.) that allows identification of the road segment(s) that connect to it and/or its geographic position (e.g., its latitude and longitude coordinates).

Referring to FIG. 2, in a present embodiment, the geographic database 30 includes point of interest data 38. The point of interest data 38 represent the various points of interest located in the geographic region 12. Points of interest include businesses, municipal buildings, historical markers, buildings, etc. The point of interest data 38 include point of interest data records. Each point of interest data record includes data attributes that relate to the represented point of interest. For example, each point of interest record may include a type (e.g., the type of point of interest, such as restaurant, hotel, city hall, police station, historical marker, ATM, golf course, etc.), the location of the point of interest, a phone number, hours of operation, etc.

The geographic database 30 may also include other kinds of data 40. The other kinds of data 40 may represent other kinds of geographic features or anything else. The geographic database 30 also includes indexes 42. The indexes 42 may include various types of indexes that relate the different types of data to each other or that relate to other aspects of the data contained in the geographic database 30.

II. Overview

Associating the Geographic Features of Two Geographic Databases

A method for associating the geographic features of two geographic databases is provided. As discussed above, the geographic databases contain data that represent geographic features, such as road segments. The method performs a proximity routine to determine a proximity relationship between the geographic features of a first geographic database and the geographic features of a second geographic database. The method performs the proximity routine over selected portions or regions of the first and second geographic databases. The proximity routine identifies feature pairs of the geographic databases that are similar and distinguishes feature pairs that are not similar. Each feature pair comprises one geographic feature of the first geographic database and one geographic feature of the second geographic database. Once the proximity routine is completed, the method performs an exclusion routine to amplify the feature pairs having a good proximity relationship and attenuate the feature pairs having a bad proximity relationship. From the results of the exclusion routine, the feature pairs comprising one geographic feature of the first geographic database that is most likely associated with one geographic feature of the second geographic database are identified.

In one embodiment of the method for determining geographic feature association between geographic features of a first geographic database and geographic features of a second geographic database, the proximity routine and exclusion routine implement a Scott and Longuet-Higgins algorithm. The Scott and Longuet-Higgins algorithm is described in a paper entitled "Uncalibrated Stereo Correspondence by Singular Value Decomposition," by Maurizio Pilu and presented at a Computer Vision & Pattern Recognition conference in June 1997.

According to one embodiment, the method identifies associated geographic feature pairs of a first geographic database I comprising m geographic features and a second geographic database comprising n geographic features. First, the proximity routine builds a proximity matrix G(m× n) from the geographic features $I_j$, i=1, 2, 3, . . . , m of the first geographic database I and from the geographic features $J_j$, j=1, 2, 3, . . . , n of the second geographic database J. The (i,j)th element of the proximity matrix G is a Gaussian-weighted distance between the two geographic features $I_i$ and $J_j$ given by the following equation.

$$G(i, j) = e^{-d_{ij}^2/2\sigma^2}$$

where $d_{ij}$ is a distance measure between the (i,j)th element and the parameter $\sigma$ controls a degree of interaction between the two geographic features.

After the proximity routine has built the proximity matrix G, the exclusion routine performs a Singular Value Decomposition (SVD) of the proximity matrix G. The SVD of the proximity matrix G is a decomposition of the proximity matrix G into the form $$G = TDU^T$$

where T is an m×m orthogonal matrix, U is an n×n orthogonal matrix, and D is an m×n diagonal matrix. The diagonal matrix is then transformed into a new matrix E by replacing each of the diagonal elements of the diagonal matrix D with one. The exclusion routine computes an association matrix P using the following product.

$$P = TEU^T$$

The association matrix P has the same shape as the proximity matrix G but the larger values of the matrix are amplified and the smaller values are attenuated. The association matrix P identifies the associated features of the two databases I and J. If P(i,j) is the largest element in both its row and column, then the features $I_i$ and $J_j$ are associated. However, if P(i,j) is not largest element in both its row and column, the feature $I_i$ competes unsuccessfully for partnership with $J_j$ and association of the features cannot be established.

Figure 3:
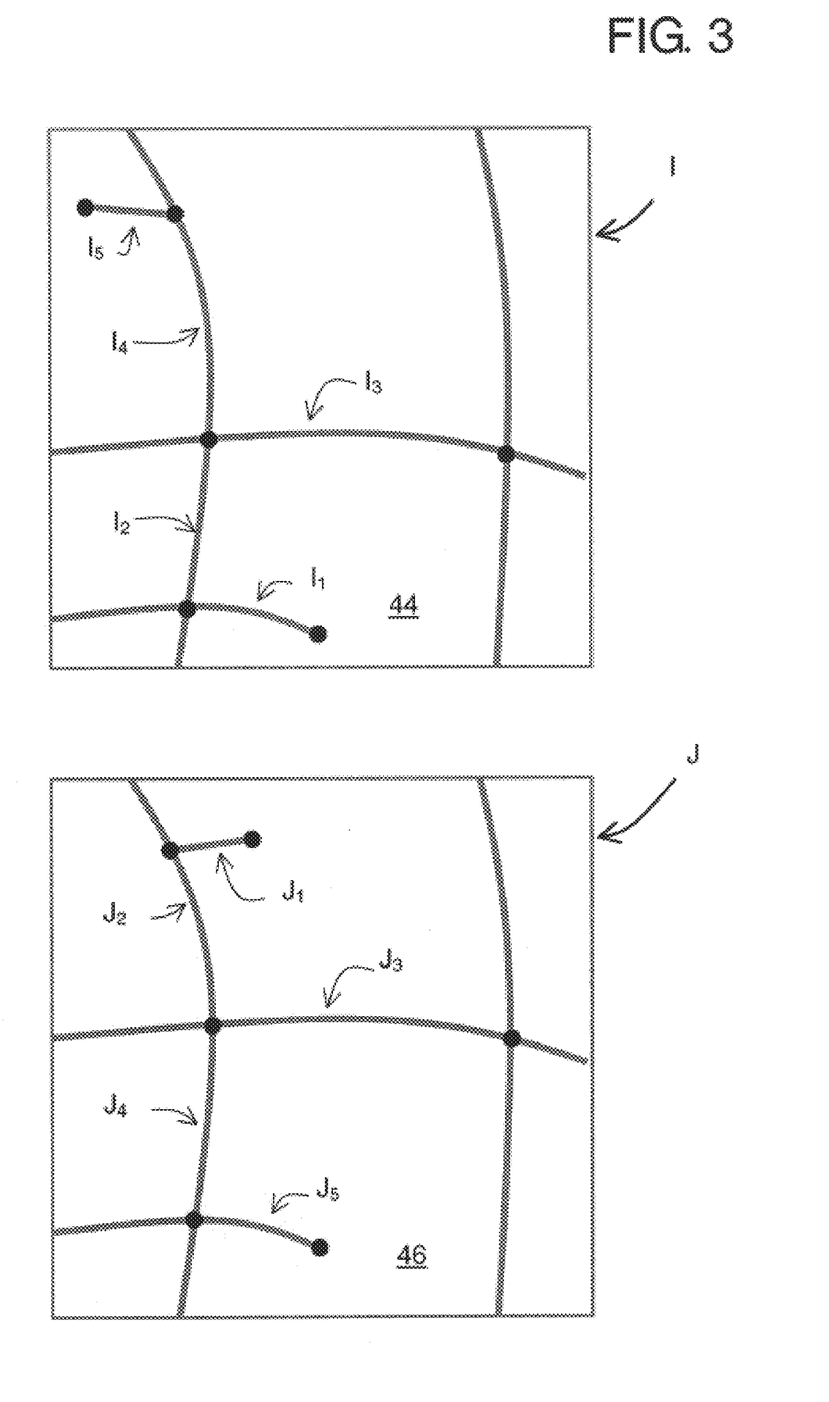
FIGS. 3I and 3J show respective maps containing a graphical representation of geographic features of a first geographic database and a map containing a graphical representation of geographic features of a second geographic database.

One embodiment of the method for determining geographic feature association between geographic features of a first geographic database and geographic features of a second geographic database will be described in conjunction with FIGS. 3I and 3J. FIG. 3I shows a map containing graphical representation of a portion 44 of a first geographic database I. The portion 44 of the geographic database I includes data representing road segments $I_1$, $I_2$, $I_3$, $I_4$ and $I_5$. FIG. 3J also shows a map containing a graphical representation of a portion 46 of a second geographic database J. The portion 46 of the geographic database J includes data representing road segments $J_1$, $J_2$, $J_3$, $J_4$ and $J_5$. In FIG. 3, the boundaries of portions 44 and 46 have identical latitude and longitude values, and both portions 44 and 46 have the same scale.

With reference to FIGS. 3I and 3J for the purpose of illustration, the method establishes which one of road segments $I_1$, $I_2$, $I_3$, $I_4$ and $I_5$ of the first geographic database I most likely corresponds to one, if any, of the road segments $J_1$, $J_2$, $J_3$, $J_4$ and $J_5$ of the second geographic database J. Although the method will be described in conjunction with associating the road segments represented by data in the two geographic databases, the method may be used for associating any type of geographic feature, such as lakes, rivers, railroads, municipalities, etc., represented in the geographic databases.

To determine the road segment association between the road segment of the first geographic database I and the road segments of the second geographic database J, the present embodiment performs the proximity routine to determine a proximity relationship between the road segments of the first and second geographic databases. The proximity routine identifies road segment pairs of the geographic databases that are similar and distinguish road segment pairs that are not similar. The method performs the proximity routine over selected portions or regions of the first and second geographic databases. For the example of FIGS. 3I and 3J, the proximity routine will be performed comparing portion 44 of the first geographic database I to portion 46 of the second geographic database J.

The proximity routine builds a proximity matrix G(m×n) from the road segments $I_i$, i=1, 2, 3, 4, 5 of the first geographic database I and from the road segments $J_j$, j=1, 2, 3, 4, 5 of the second geographic database J. The (i,j)th element of the proximity matrix G is a Gaussian-weighted distance between the two road segments $I_i$ and $J_j$ given by the following equation.

$$G(i,j) = e^{-d_{ij}^2/2\sigma^2}$$

where $d_{ij}$ is a distance measure between the (i,j)th element and the parameter σ controls a degree of interaction between the two geographic features. A small σ value amplifies local interactions, and σ larger a value identifies more global interactions. The proximity matrix for the geographic databases I and J of FIG. 3 has the following form.

| $G(I_1,J_1)$ | $G(I_2,J_1)$ | $G(I_3,J_1)$ | $G(I_4,J_1)$ | $G(I_5,J_1)$ |
|---|---|---|---|---|
| $G(I_1,J_2)$ | $G(I_2,J_2)$ | $G(I_3,J_2)$ | $G(I_4,J_2)$ | $G(I_5,J_2)$ |
| $G(I_1,J_3)$ | $G(I_2,J_3)$ | $G(I_3,J_3)$ | $G(I_4,J_3)$ | $G(I_5,J_3)$ |
| $G(I_1,J_4)$ | $G(I_2,J_4)$ | $G(I_3,J_4)$ | $G(I_4,J_4)$ | $G(I_5,J_4)$ |
| $G(I_1,J_5)$ | $G(I_2,J_5)$ | $G(I_3,J_5)$ | $G(I_4,J_5)$ | $G(I_5,J_5)$ |

The distance measure $d_{ij}$ for the (i,j)th element represents a comparison of the two geographic features. For example, the distance measurement may be a Euclidean distance between the geographic features. The distance measurement may be a shape comparison of the geographic features, such as a quantitative measure of geometric distortion between the two shapes that represent the geographic features. Furthermore, the distance measurement may be a quantity that takes into account other attributes of the geographic features or a combination of these or other comparisons known to one skilled in the art. For road segments, the distance measurement may be the Euclidean distance between the nodes of the road segments or between the midpoints of the road segments. Measurement of the shape similarity of the road segments may be performed by cross-correlation of the road segments, by calculating the area between the two superimposed road segments, by calculating a Rotational Variation Metric, by calculating a multi-resolution trend metric or any other method known to those skilled in the art as well as other methods. The distance measurement may incorporate several quantities such as a combination of Euclidean distance between the segments and shape comparison of the road segments. The multi-resolution trend metric is disclosed in U.S. patent application Ser. No. 09/862,378 entitled "Multi-Resolution Trend Metric for Shape Comparison and Applications Thereof" filed May 5, 2001, the entire disclosure of which is incorporated herein by reference.

Briefly, the Rotational Variation Metric provides a quantitative measure of similarity in shape between a pair of segments. The Rotational Variation Metric is disclosed in U.S. patent application Ser. No. 09/772,586 entitled "Shape Comparison Using A Rotational Variation Metric and Applications Thereof" filed Jan. 30, 2001, the entire disclosure of which is incorporated herein by reference. To obtain the quantitative measurement of the geometric distortion between two road segments, the road segments A and B are first scaled to equal lengths or to a nominal length of unity. Next, tangent vectors at corresponding points along segments A and B are determined. The magnitude of the angle between each pair of tangent vectors is calculated with the following equation.

$$\Theta = \cos^{-1}\frac{\overline{A} \cdot \overline{B}}{\|\overline{A}\|\|\overline{B}\|}$$

The variance or Rotational Variation Coefficient ("RVC") of the plot around the mean value of the magnitude of the angle Θ between each pair of tangent vectors is a quantitative measure of the similarity in shape of segments A and B. A RVC of zero indicates that the one segment is rotated with respect to the other segment by a constant angle. A large RVC indicates that the angle of rotation between the segments is not constant representing that there is a large amount of geometric distortion between the segments.

Returning to the proximity matrix G, the (i,j)th element of the proximity matrix G decreases in value from one to zero with the increasing distance measurement quantity. The (i,j)th element of the proximity matrix G is large (close to one) if the distance measurement between $I_i$ and $J_j$ is small, and the (i,j)th element of the proximity matrix G is small (close to zero) if the distance measurement between $I_i$ and $J_j$ is large. In the desired case, the (i,j)th element of the proximity matrix G would be a nonzero value for those $I_i$ and $J_j$ features whose distance measurement is minimum. In all other locations, the proximity matrix elements would be approximately zero. In an alternative embodiment, another equation for the proximity matrix may be used as known to those skilled in the art. The equation for the proximity matrix should assist in identifying feature pairs of the geographic databases that are similar and distinguish feature pairs that are not similar. In another alternative embodiment, the proximity routine does not build the proximity matrix; rather, the proximity routine may be another routine that identifies feature pairs of the geographic databases that are similar and distinguish feature pairs that are not similar as known to one skilled in the art.

For the example shown in FIGS. 3I and 3J, the proximity matrix G is formed for the road segments to determine the proximity of each segment of the first database I and to each segment of the second database J. For the purpose of illustration, the distance measurement is the Euclidean distance between the midpoints of the segments. In the present example of FIGS. 3I and 3J, the $I_2$ segment corresponds to the $J_4$ segment, the $I_3$ segment corresponds to the $J_3$ segment, and the $I_4$ segment corresponds to the $J_2$ segment, so the distance measurement between these segments is zero and their proximity matrix element is one. The $I_1$ and $J_5$ segments are similar with only a minimum Euclidean distance separating their midpoints, and the $I_5$ and $J_1$ segments are very different with their midpoints separated by a Euclidean distance approximately equal to the Euclidean distance separating the $I_4$ and $J_1$ midpoints and $I_5$ and $J_2$ midpoints. The values shown below for the $(I_1,J_5)$, $(I_4,J_1)$ $(I_5,J_1)$ and $(I_5,J_2)$ elements have been chosen for illustrative values and do not represent any actual calculation. The proximity matrix is as follows.

$$\begin{matrix} 0 & 0 & 0 & 0 & 0.9 \\ 0 & 0 & 0 & 1 & 0 \\ 0 & 0 & 1 & 0 & 0 \\ 0.1 & 1 & 0 & 0 & 0 \\ 0.1 & 0.1 & 0 & 0 & 0 \end{matrix}$$

In some cases, it is possible to determine that one feature of the first database I is associated with one feature of the second database J from the proximity matrix. The feature pairing having the best proximity value in its row and its column of the proximity matrix is mostly likely associated. For the simple example of FIG. 3, the proximity matrix shows that the pairings of $(I_2,J_4)$; $(I_3,J_3)$ and $(I_4,J_2)$ are likely associated.

Once the proximity routine is complete with the proximity matrix formed, the method performs the exclusion routine. The exclusion routine automatically amplifies the good pairings of the features and attenuates the bad pairings of features. For the example proximity matrix above, the exclusion routine amplifies the element $(I_5,J_1)$ and attenuates the elements $(I_4,J_1)$, $(I_5,J_1)$ and $(I_5,J_2)$.

In one embodiment, the exclusion routine performs a Singular Value Decomposition (SVD) of the proximity matrix G. The SVD of the proximity matrix G is a decomposition of the proximity matrix G into the form $$G = TDU^T$$

where T is an m×m orthogonal matrix, U is an n×n orthogonal matrix, and D is a m×n diagonal matrix. The diagonal matrix D is transformed into a new matrix E by replacing each diagonal element of the diagonal matrix D with one. An association matrix is computed using the following product.

$$P = TEU^T$$

The association matrix P has the same shape as the proximity matrix G but the larger values of the matrix are amplified and the smaller values are attenuated. The association matrix P identifies the associated features of the two databases I and J. If P(i,j) is the largest element in both its row and column, then the features $I_i$ and $J_j$ are associated. However, if P(i,j) is not largest element in both its row and column, the feature $I_i$ competes unsuccessfully for partnership with $J_j$ and association of the features cannot be established. Due to the orthogonality of the association matrix, the squares of the elements in each row must add up to one. This orthogonality provides a given feature $I_i$ cannot be strongly associated with more than one feature $J_j$. The mutual orthogonality of the rows of the association matrix tends to keep different features in the first geographic database I from becoming closely associated with the same feature in the second geographic database J. The following represents the association matrix for the example shown in FIGS. 3I and 3J. The values in the association matrix have been chosen for illustrative value and do not represent any actual calculation.

$$\begin{matrix} 0 & 0 & 0 & 0 & 1 \\ 0 & 0 & 0 & 1 & 0 \\ 0 & 0 & 1 & 0 & 0 \\ 0 & 1 & 0 & 0 & 0 \\ 0.71 & 0.71 & 0 & 0 & 0 \end{matrix}$$

With the proximity routine and exclusion routine, the present method automatically identifies associated geographic feature pairs from the first and second geographic databases I and J. Specifically, the method identifies whether each feature of geographic database I is associated with one of geographic features of the second database J. For the example of FIGS. 3I and 3J, the association matrix illustrates an association between road segments $I_1$ and $J_5$, road segments $I_2$ and $J_4$, road segments $I_3$ and $J_3$, and road segments $I_4$ and $J_2$. The association matrix also illustrates no association between the road segments $I_5$ and $J_1$. In an alternative embodiment, the exclusion routine does not need to calculate the SVD or association matrix P; rather, the exclusion routine may be another routine designed to amplify the good pairings of the features and attenuates the bad pairings of features as known to one of ordinary skill in the art.

In an alternative embodiment, a similarity routine may be incorporated into the method for establishing associations between geographic features of two geographic databases. The similarity routine first establishes which features are the most similar before performing the proximity routine. In one embodiment, the similarity routine performs a cross-correlation between the features of the geographic databases I and J. The proximity routine as disclosed above would then provide a correlation-weighted proximity. The (i,j)th element of the correlation-weighted proximity matrix G is given by the following equation:

$$G(i, j) = \left[ e^{-(C_{ij}-1)^2/\gamma^2} \right] \cdot e^{-d_{ij}^2/2\sigma^2}$$

where the bracket term is a Gaussian-weighted function of the correlation in which γ determines how quickly its values decrease with a diminishing $C_{ij}$. The correlation-weighted Scott and Longuet-Higgins algorithm is described in a paper entitled "Uncalibrated Stereo Correspondence by Singular Value Decomposition," by Maurizio Pilu and presented at a Computer Vision & Pattern Recognition conference in June 1997. Other similarity routines are possible as known to one skilled in the art.

III. Application to Determining Relative Accuracy of a Geographic Database

Figure 4:
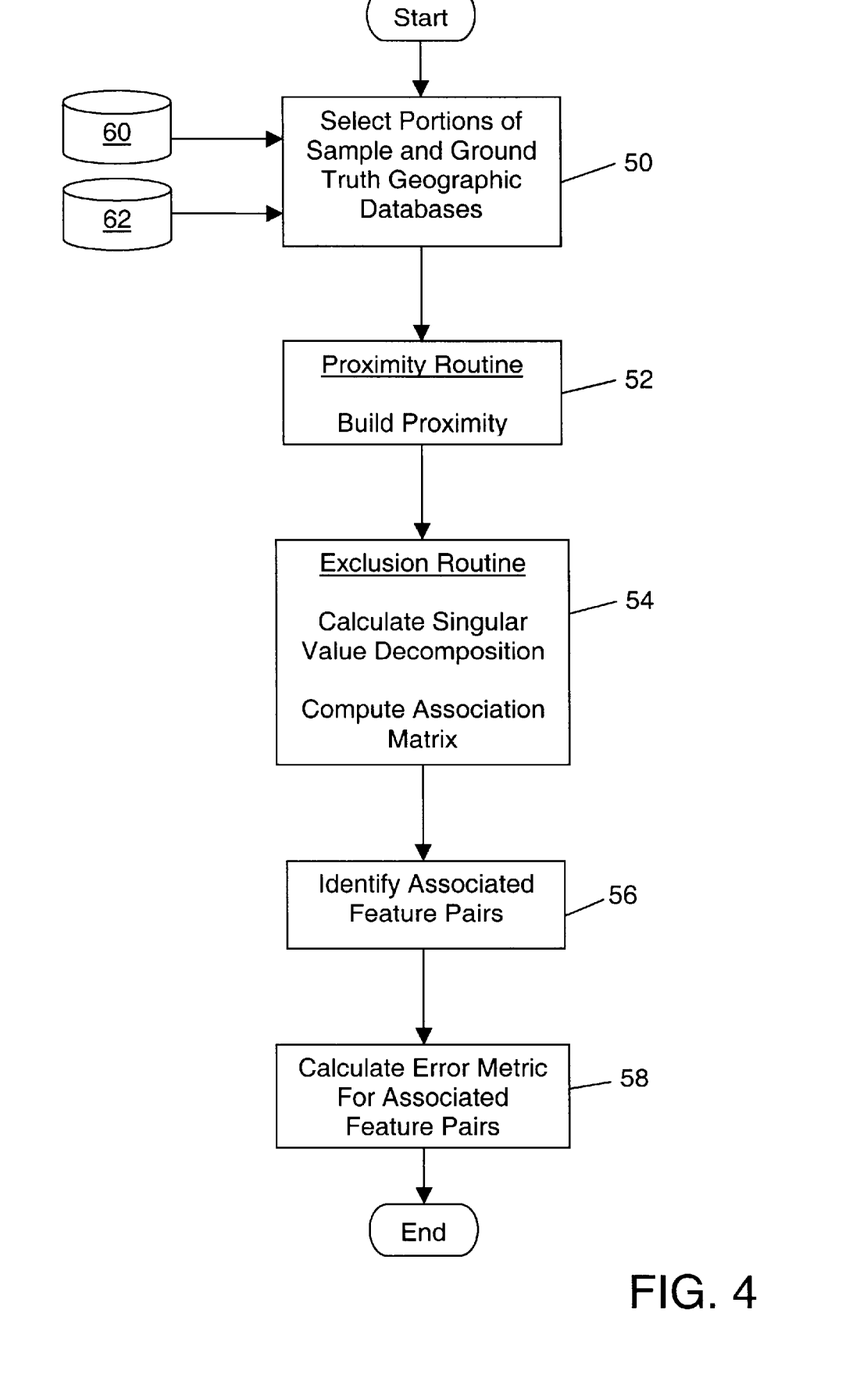
FIG. 4 is a flow chart for determining database accuracy.

The method for establishing geographic feature association of two databases can be directly applied to evaluating the accuracy of a geographic database. Application of this method to evaluate how closely the representations of numerous geographic features (i.e. road segments) matches the actual geographic features (ground truth) is described in connection with FIGS. 4, 5 and 6. FIG. 4 illustrates a flow chart for performing the method to determine relative accuracy of a geographic database. The method may be performed using a computer. As shown in FIG. 4 at the first step 50, a portion of a ground truth geographic database 60 and the same portion of a sample database 62 are selected to determine the relative accuracy of that portion of the sample geographic database 62. The selected portions of the two geographic databases represent the identical geographic region having identical latitude and longitude boundaries.

Figure 5:
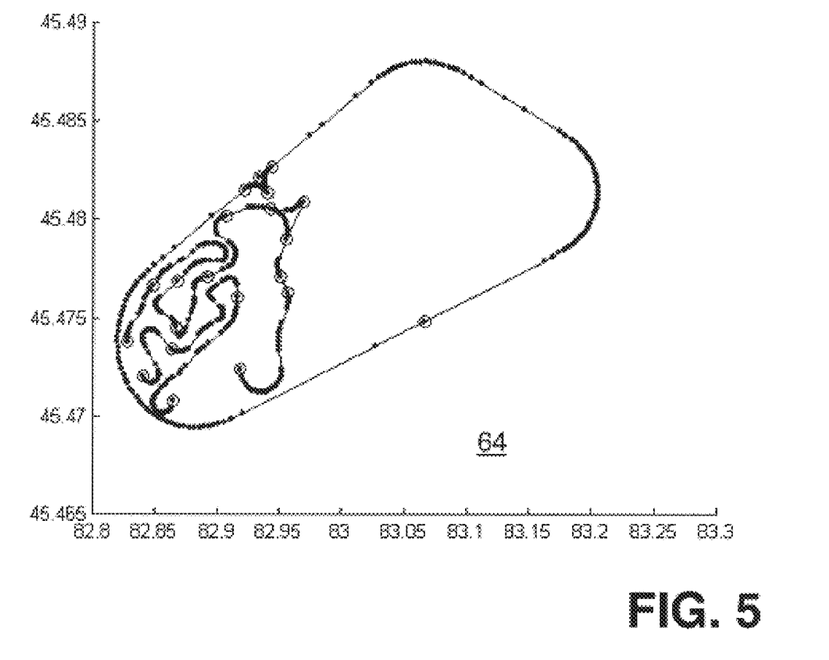
FIG. 5 is a map containing a graphical representation of geographic features of a ground truth geographic database.
Figure 6:
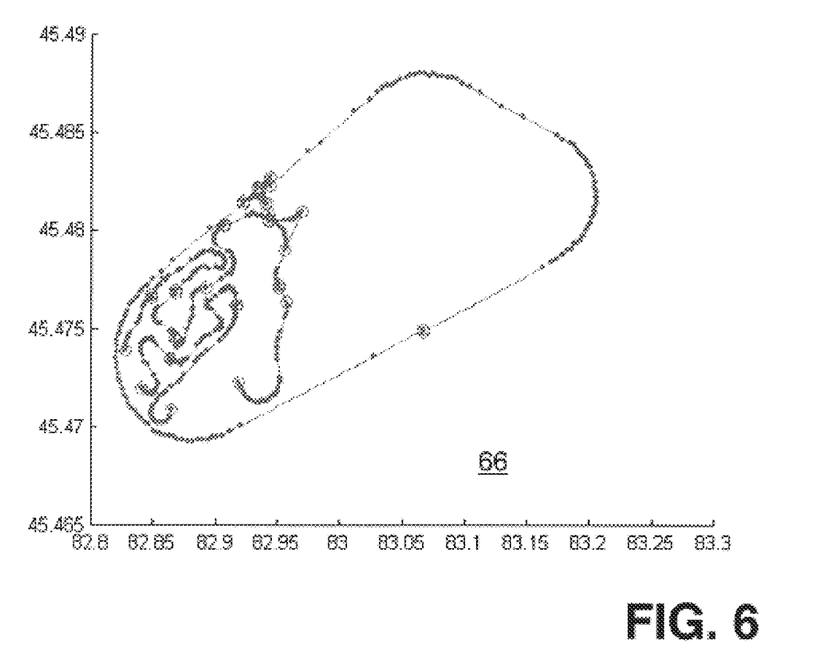
FIG. 6 is a map containing a graphical representation of geographic features of a sample geographic database.

FIG. 5 shows a map containing a graphical representation of a selected portion 64 of a ground truth geographic database 60 with a latitude range of 82.8 to 83.3 and a longitudinal range of 45.465 to 45.49. The ground truth database 60 shown in FIG. 5 holds the ground truth representation of the geographic features within the selected portion 64 of the geographic region. FIG. 6 is map containing a graphical representation of a selected portion 66 of a sample geographic database 62 with a latitude range of 82.8 to 83.3 and a longitudinal range of 45.465 to 45.49. The sample geographic database 62 shown in FIG. 6 holds sample representations of the geographic features within the selected geographic region whose accuracy is to be determined. For the purpose of this illustration, the sample geographic database 62 shown in FIG. 6 was created by applying random distortions to the ground truth geographic database 60. For this example, the label numbering on the road segments of the sample geographic database 62 is identical to the label number of the ground truth geographic database, so the Nth segment in the ground truth geographic database 60 should be associated with the Nth segment in the sample geographic database 62.

To establish an association between the geographic features of the ground truth geographic database 60 and the sample geographic database 62, the proximity routine is performed to establish a proximity relationship between the geographic features of the ground truth and sample geographic databases at step 52. The proximity routine builds the proximity matrix G(m×n) from the road segments of the ground truth geographic database 60 and from the road segments of the sample geographic database 62. The proximity matrix is built using the equation described above. For the present example, the distance measure $d_{ij}$ between the road segments is the rotational variation coefficient value as described above.

Figure 7:
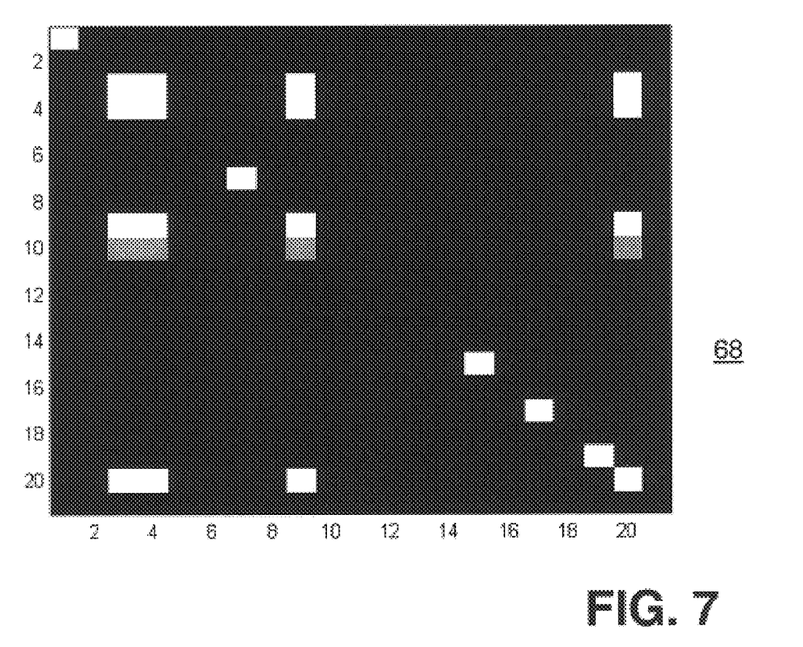
FIG. 7 is a gray scale image of a proximity matrix.

FIG. 7 shows a graphical form of the proximity matrix for the road segments of the ground truth and sample geographic databases. FIG. 7 is a gray scale image of the matrix to better illustrate the structure of the proximity matrix 68. The labels on the axis of the proximity matrix indicate the road segment label numbers. For this example with the segments of both databases having identical label numbers, if the ground truth database and the sample database are identical, the proximity matrix would be a diagonal matrix indicating that the Nth segment in the ground truth database corresponds to the Nth segment in the sampled database because this is how the segments in the sample database were labeled with respect to the ground truth segments. For the present example shown in FIG. 7, the proximity matrix 68 is close to diagonal, but to better identify association between segments of the ground truth database 60 and segments of the sample database 62, the exclusion routine is performed at step 54.

The exclusion routine automatically amplifies the good pairings of the segments and attenuates the bad pairings of segments. For the present example, the exclusion routine performs the singular value decomposition (SVD) of the proximity matrix 68. The SVD of the proximity matrix 68 is a decomposition of the proximity matrix 68 into the form $G=TDU^T$ as described above. Using the SVD of the proximity matrix 68, the SVD is converted into a new matrix E by replacing each diagonal element of the diagonal matrix D with one and computing an association matrix ($P=TEU^T$) as described above.

Figure 8:
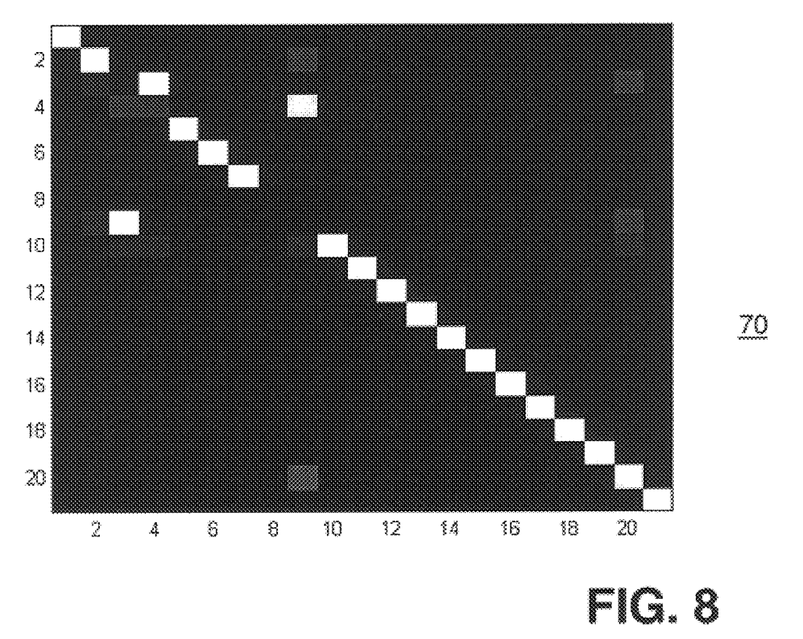
FIG. 8 is a gray scale image of an association matrix.

FIG. 8 shows a graphical form of the association matrix 70 for the road segments of the ground truth and sample geographic databases. FIG. 8 is a gray scale image of the matrix to better illustrate the structure of the association matrix 70. As illustrated by FIG. 8, the association matrix 70 is closer to diagonal than the proximity matrix 68 of FIG. 7. The association matrix 70 has the same shape as the proximity matrix 70 but the larger values of the matrix 68 have been amplified and the smaller values have been attenuated. The association matrix 70 identifies the associated pairs of segments of the ground truth database 60 and the segments of the sample database 62. If the element in the association matrix 70 is the largest element in both its row and column, the segments forming that element from the ground truth database 60 and sample database 62 are assumed to be associated. However, if the element is not largest element in both its row and column, the segments forming that element from the ground truth database 60 and sample database 62 cannot be assumed to be associated.

At step 56, the associations between the ground truth segments and sample segments are identified from the association matrix. An association file is created containing the associated pairs of segments. Each pair of associated segments is then evaluated with an accuracy metric at step 58. The accuracy metric evaluates how closely the representation of the geographic feature, the sample road segment, matches the actual geographic feature, the ground truth road segment. One accuracy metric is the Rotational Variation Metric discussed above. The smaller the value of the rotational variation coefficient between the associated segment pair, the closer the shape of the sample segment is to the shape of the ground truth segment. If the rotational variation coefficient is zero, then the sample segment is identical in shape to the ground truth segment though it may be translated or rotated with respect to the ground truth segment. The rotational variation coefficient can be used to determine the relative or shape accuracy of features represented in a geographic database. Other accuracy metrics include cross-correlation, the multi-resolution trend metric or others as known to one skilled in the art. The results of the accuracy metric illustrate the accuracy of the sampled geographic database.

IV. Other Applications for the Method of Associating Geographic Features of two Geographic Databases The method for associating the geographic features of two geographic databases may be used in conjunction with other applications. The method may be used for change detection of geographic database. Geographic databases are updated with new geographical information because geographical information is perishable. For example, new subdivisions and roads are built and existing roads are modified. When a new version of the geographic database is prepared, it is desirable to detect changes in the geographic database. Specifically, it is desirable to identify geographical features represented in the new geographic database that were not present in the previous version of the geographic database.

To identify geographical features present in the new version of the geographic database that were not present in the previous version of the geographic database, the method is used to identify geographic features of the previous geographic database associated with geographic features of the new geographic database. Once the geographic features of the new geographic database associated with geographic features are identified, the features of the new geographic database that are not associated with features of the previous database may be identified as most likely added features. Added features are features that were introduced as new features to the new database and were not known data in the previous database. The features of the previous geographic database that are not associated with features of the new database may be identified as most likely deleted features. Deleted features are features that were present in the previous database but were removed from the new database.

In addition to establishing added and deleted features in the new database, changes to associated features of the previous and new database may also be established. For example, when a geographic database is updated, the shape of a road segment may be changed. Changes in shape of the road segment may be identified with a shape comparison measurement such as by cross-correlation of the road segments, by calculating a Rotational Variation Metric, by calculating a multi-resolution trend metric or any other method known to those skilled in the art as well as other methods.

The method for identifying associations between the geographic features of two geographic databases may be used in conjunction with other applications. The method may also be used for database conflation. Geographic database conflation is a process of combining two geographic databases together to create a new geographic database that is combines the contents of the two source geographic databases. For example, one geographic database contains data representing one geographic region and another geographic database contains data representing a portion of the same geographic region and data representing an adjacent geographic region. By performing database conflation, the data of both geographic databases may be combined to create a new database containing data representing both geographic regions.

To perform database conflation, the geographic feature association method is used to identify geographic features of the one geographic database associated with geographic features of the other geographic database. Once the associated geographic feature pairs are identified, the features of each database that do not have associations may be added or deleted from the new database. The associated feature pairs may be tested to determine whether to select one feature of the pair over the other for addition to or deletion from the new database or to establish a new representation of the geographic feature in the new database. The features may be tested with cross-correlation or other shape comparison measurements known to those skilled in the art as well as other methods.

It is intended that the foregoing detailed description be regarded as illustrative rather than limiting and that it is understood that the following claims including all equivalents are intended to define the scope of the invention.

I claim:

1. A method of determining geographic feature association between the features of a first geographic database and geographic features of a second geographic database comprising the steps of:

building an m×n proximity matrix G comprising a proximity value element for each of the m features of the first geographic database compared to each of the n features of the second geographic database;

computing a singular value decomposition of the proximity matrix G into a form $G=TDU^T$ where T is an m×m orthogonal matrix, U is an n×n orthogonal matrix, and D is a m×n diagonal matrix having a plurality of diagonal elements;

converting the singular value decomposition into an association matrix by forming matrix E by replacing each of the diagonal elements of the diagonal matrix with one and computing the association matrix P using the following product $P=TEU^T$; and identifying an associated feature pair comprising the feature in the first geographic database and the feature of the second geographic database that is a largest element in both one of the rows and one of the columns of the association matrix.

2. The method of claim 1 wherein the proximity matrix is a Gaussian-weighted distance measurement.

3. The method of claim 2 wherein the distance measurement is an Euclidean distance between the feature of the first geographic database and the feature of the second geographic database.

4. The method of claim 2 wherein the distance measurement is a comparison of a shape of the feature of the first geographic database to a shape of the feature of the second geographic database.

5. The method of claim 4 wherein the distance measurement is a rotational variation coefficient.

6. The method of claim 1 wherein the proximity matrix is a correlation weighted measurement.

7. The method of claim 1 further including:
computing an error metric for each associated feature pair.

8. The method of claim 1 further including:
identifying geographic features of the first geographic database that are not included in the associated feature pairs.

9. The method of claim 1 further including:
identifying non-associated geographic features of the first geographic database and the second database that are not included in the associated feature pairs;

incorporating the non-associated features into a conflation database; and incorporating one of the features of each of the associated feature pairs into the conflation database.

10. A method of determining geographic feature association between geographic features of a first geographic database and geographic features of a second geographic database comprising the steps of:

determining a plurality of proximity relationship values comparing the geographic features of the first geographic database to the geographic features of the second geographic database;

amplifying the proximity relationship values representing the geographic features of the first geographic database likely related to the geographic features of the second geographic database;

attenuating the proximity relationship values representing the geographic features of the first geographic database unlikely related to the geographic features of the second geographic database;

identifying an associated feature pair comprising one geographic feature of the first geographic database and one geographic feature of the second geographic database, the associated feature pair having a best proximity relationship value from a set of proximity relationship values comparing the one geographic feature of the first geographic database to a plurality of geographic features of the second geographic database.

11. The method of claim 10 wherein said determining the plurality of proximity relationship values comprises comparing each of the geographic features of a first region of the first geographic database to each of the geographic features of a second region of the second geographic database.

12. The method of claim 10 wherein said determining the plurality of proximity relationship values comprises building a m by n proximity matrix G, the first geographic database having m geographic features, the second geographic database having n geographic features, the proximity matrix comprises a proximity relationship value element for each of the m features in the first geographic database compared to each of the n features of the second geographic database.

13. The method of claim 12 wherein the steps of amplifying and attenuating comprise:

computing a singular value decomposition of the proximity matrix G into a form $G=TDU^T$ where T is an m by m orthogonal matrix, U is an n by n orthogonal matrix, and D is a m by n diagonal matrix having a plurality of diagonal elements; and converting the singular value decomposition into an association matrix P by forming matrix E by replacing each of the diagonal elements of the diagonal matrix with one and computing the association matrix P using the following product $P=TEU^T$.

14. The method of claim 13 wherein the step of identifying the associated feature pair comprises identifying a largest element in both the row and the column of the association matrix.

15. The method of claim 10 wherein the proximity relationship values represent a Gaussian-weighted distance measurement between the geographic features of the first geographic database and the geographic features of the second geographic database.

16. The method of claim 15 wherein the distance measurement is an Euclidean distance between the geographic feature of the first geographic database and the geographic feature of the second geographic database.

17. The method of claim 15 wherein the distance measurement is a comparison of a shape of the geographic feature of the first geographic database to a shape of the geographic feature of the second geographic database.

18. A program for determining a feature association between two geographic databases comprising:

a proximity routine determining a proximity measurement between each feature of the two geographic databases;

an exclusion routine excluding the proximity measurements representing the features of the two databases unlikely to be related; and an identification routine identifying a plurality of associated feature pairs, each associated feature pairs comprise one feature from each of the two geographic databases, the associated feature pair having a best proximity measurement from a set of proximity measurements comparing one feature of one of the databases to each feature of the other database.

19. The invention of claim 18 wherein the proximity measurement is comparison of a shape of the feature of the first geographic database to a shape of the feature of the second geographic database.

20. The invention of claim 18 wherein the exclusion routine forms an orthogonal matrix from the proximity measurements.

* * * * *